United States Patent
Pence et al.

(10) Patent No.: US 11,427,327 B2
(45) Date of Patent: Aug. 30, 2022

(54) AIRCRAFT SEAT WITH SPRING-ASSISTED ACTUATION

(71) Applicant: B/E Aerospace, Inc., Winston-Salem, NC (US)

(72) Inventors: Tracy Pence, King, NC (US); Twinkle V. Jacob, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/219,127

(22) Filed: Mar. 31, 2021

(65) Prior Publication Data
US 2021/0323679 A1   Oct. 21, 2021

Related U.S. Application Data

(60) Provisional application No. 63/011,097, filed on Apr. 16, 2020.

(51) Int. Cl.
*B64D 11/06* (2006.01)

(52) U.S. Cl.
CPC ...... *B64D 11/0641* (2014.12); *B64D 11/0696* (2013.01)

(58) Field of Classification Search
CPC .................. B64D 11/0641; B64D 11/0696
See application file for complete search history.

(56) References Cited

U.S. PATENT DOCUMENTS

| 5,803,545 | A | 9/1998 | Guguin |
| 6,279,994 | B1 | 8/2001 | Gehart |
| 8,615,828 | B2 | 12/2013 | Schermel |
| 9,801,782 | B2 | 10/2017 | Lurie et al. |
| 10,259,584 | B2 | 4/2019 | Oleson et al. |
| 2003/0080597 | A1* | 5/2003 | Beroth ............... B64D 11/0641 297/423.26 |
| 2015/0284087 | A1 | 10/2015 | Henshaw |

FOREIGN PATENT DOCUMENTS

| EP | 3524522 A1 | 8/2019 |
| GB | 926023 A | 5/1963 |
| GB | 2184770 B | 10/1989 |
| WO | 2019229511 A1 | 12/2019 |

OTHER PUBLICATIONS

Extended Search Report for European Application No. 21167556.6 dated Aug. 23, 2021, 9 pages.

* cited by examiner

*Primary Examiner* — Anthony D Barfield
(74) *Attorney, Agent, or Firm* — Suiter Swantz pc llo

(57) ABSTRACT

An aircraft seat may include an upper aircraft seat assembly, a lower aircraft seat assembly, and a frame actuation assembly configured to actuate the upper aircraft seat assembly relative to the lower aircraft seat assembly. The lower aircraft seat assembly may include at least one spring coupled to a foundation with a sloped actuation surface configured to cause the upper aircraft seat assembly to be at a decreased height when in a bed position. The compressing of the at least one spring may be configured to counterbalance a load within the aircraft seat and generate a controlled actuation of the upper aircraft seat assembly from an upright position to the bed position. A return force provided by the at least one spring may assist the frame actuation assembly during actuation of the upper aircraft seat assembly from the decreased height of the bed position to the upright position.

15 Claims, 11 Drawing Sheets

AIRCRAFT SEAT WITH SPRING-ASSISTED ACTUATION

CROSS-REFERENCE TO RELATED APPLICATIONS

The present application is related to and claims benefit of the earliest available effective filing date from the following applications: the present application claims the benefit of U.S. Provisional Application Ser. No. 63/011,097, filed Apr. 16, 2020, which is incorporated herein by reference in the entirety.

BACKGROUND

Select aircraft seats may be configured to actuate between an upright or raised position and a lie-flat or bed position. This actuation may occur with the assistance of an actuator motor. In instances where power is cut to the actuator motor, or the actuator motor is subjected to an excessive load (e.g., passenger weight, or the like), the select aircraft seats may not be able to return from the lie-flat or bed position to the upright or raised position. In addition, the size of the actuator motor may require valuable living space within a passenger compartment be utilized by the aircraft seat.

SUMMARY

An aircraft seat is disclosed, in accordance with one or more embodiments of the disclosure. The aircraft seat may include an upper aircraft seat assembly configured to actuate between an upright position and a bed position. The upper aircraft seat assembly may include a seat pan frame. The upper aircraft seat assembly may include at least one spring hook coupled to the seat pan frame. The aircraft seat may include a lower aircraft seat assembly. The lower aircraft seat assembly may include a foundation coupled to a floor of an aircraft cabin. The foundation may include a sloped actuation surface configured to cause the upper aircraft seat assembly to be at a decreased height relative to the floor of the aircraft cabin when the upper aircraft seat assembly is in the bed position. The lower aircraft seat assembly may include at least one spring coupled to the foundation. The at least one spring may be extended when the upper aircraft seat assembly is in the upright position. The at least one spring may be compressed by the at least one spring hook when the upper aircraft seat assembly is in the bed position. The compressing of the at least one spring may be configured to generate a return force within the at least one spring. The compressing of the at least one spring may be configured to counterbalance a load within the aircraft seat and generate a controlled actuation of the upper aircraft seat assembly from the upright position to the bed position. The aircraft seat may include a frame actuation assembly configured to actuate the upper aircraft seat assembly relative to the lower aircraft seat assembly between the upright position and the bed position. The at least one spring may be configured to provide the return force against the at least one spring hook and assist the frame actuation assembly during actuation of the upper aircraft seat assembly from the decreased height of the bed position to the upright position.

In some embodiments, the at least one spring may include a protrusion. The at least one spring hook may include a recess. The recess of the at least one spring hook may be configured to mate with the protrusion of the at least one spring when the at least one spring hook compresses the at least one spring.

In some embodiments, the at least one spring may include a dampener. The dampener may be configured to control a release of the return force against the at least one spring hook when assisting the frame actuation assembly during actuation of the upper aircraft seat assembly from the bed position to the upright position.

In some embodiments, the at least one spring may include two springs. The at least one spring hook may include two spring hooks. The two spring hooks may be coupled to a spring hook bracket.

In some embodiments, the frame actuation assembly may include a first component coupled to the seat pan frame. The frame actuation assembly may include an actuator motor configured to drive the first component. The frame actuation assembly may include a second component coupled to the foundation. The second component may be configured to engage the first component. The upper aircraft seat assembly may be configured to actuate between the upright position and the bed position relative to the lower aircraft seat assembly when the first component is driven by the actuator motor.

In some embodiments, the first component may include a spur gear. The second component may include a gear rack of the seat pan frame.

In some embodiments, at least one of a size or a power output of the actuator motor may be selected based on the addition of the at least one spring within the aircraft seat.

In some embodiments, the upper aircraft seat assembly may include a seat pan cushion coupled to the seat pan frame. The upper aircraft seat assembly may include a seat back cushion coupled to the seat pan cushion. The seat pan cushion and the seat back cushion may be configured to form a bed surface when the upper aircraft seat assembly is in the bed position.

In some embodiments, the seat back cushion may be coupled to the foundation via at least one actuation linkage.

In some embodiments, the seat back cushion may be configured to rotate about an axis through a pivot joint coupling the seat back cushion and the at least one actuation linkage when the upper aircraft seat assembly actuates between the upright position and the bed position.

In some embodiments, the seat back cushion may be configured to rotate about an axis through a pivot joint coupling the foundation and the at least one actuation linkage when the upper aircraft seat assembly actuates between the upright position and the bed position.

In some embodiments, the seat back cushion and the seat pan cushion may be configured to form a bed surface when the upper aircraft seat assembly is in the bed position.

A passenger compartment of an aircraft cabin is disclosed, in accordance with one or more embodiments of the disclosure. The passenger compartment may include a privacy shell. The passenger compartment may include an aircraft seat positioned within the privacy shell. The aircraft seat may include an upper aircraft seat assembly configured to actuate between an upright position and a bed position. The upper aircraft seat assembly may include a seat pan frame. The upper aircraft seat assembly may include at least one spring hook coupled to the seat pan frame. The aircraft seat may include a lower aircraft seat assembly. The lower aircraft seat assembly may include a foundation coupled to a floor of the aircraft cabin. The lower aircraft seat assembly may include at least one spring coupled to the foundation. The foundation including a sloped actuation surface configured to cause the upper aircraft seat assembly to be at a decreased height relative to the floor of the aircraft cabin when the upper aircraft seat assembly is in the bed position.

The at least one spring may be extended when the upper aircraft seat assembly is in the upright position. The at least one spring may be compressed by the at least one spring hook when the upper aircraft seat assembly is in the bed position. The compressing of the at least one spring may be configured to generate a return force within the at least one spring. The compressing of the at least one spring may be configured to counterbalance a load within the aircraft seat and produce a controlled actuation of the upper aircraft seat assembly from the upright position to the bed position. The aircraft seat may include a frame actuation assembly configured to actuate the upper aircraft seat assembly relative to the lower aircraft seat assembly between the upright position and the bed position. The at least one spring may be configured to provide the return force against the at least one spring hook and assist the frame actuation assembly during actuation of the upper aircraft seat assembly from the decreased height of the bed position to the upright position.

In some embodiments, the passenger compartment may include an ottoman. The ottoman may be positioned proximate to the aircraft seat within the privacy shell.

In some embodiments, the upper aircraft seat assembly may include a seat pan cushion coupled to the seat pan frame. The upper aircraft seat assembly may include a seat back cushion coupled to the seat pan cushion. The seat back cushion, the seat pan cushion, and the ottoman may be configured to form a bed surface when the upper aircraft seat assembly is in the bed position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
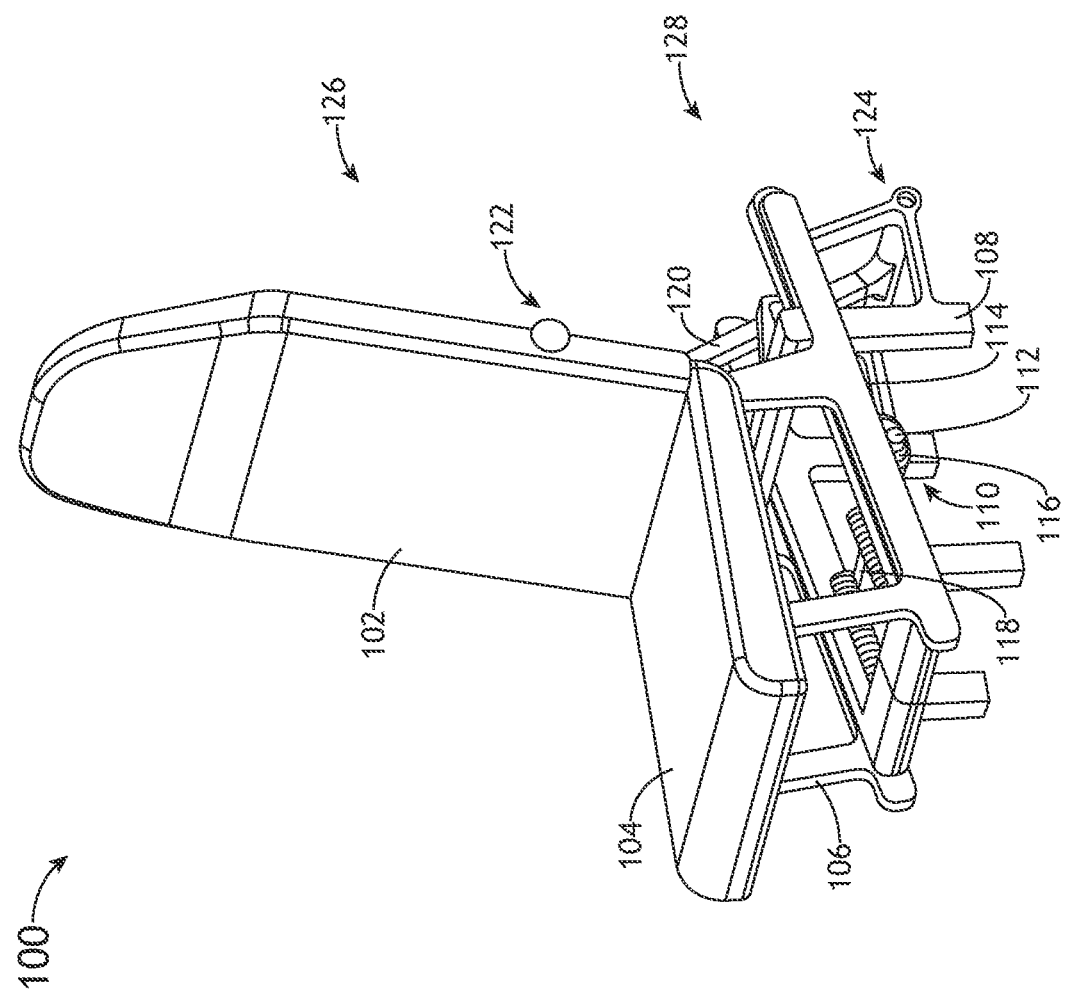
FIG. 1 illustrates a perspective view of an aircraft seat with spring-assisted actuation, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5C in general illustrate an aircraft seat with spring-assisted actuation, in accordance with one or more embodiments of the disclosure.

Select aircraft seats may be configured to actuate between an upright or raised position and a lie-flat or bed position. This actuation may occur with the assistance of an actuator motor. In instances where power is cut to the actuator motor, or the actuator motor is subjected to an excessive load (e.g., passenger weight, or the like), the select aircraft seats may not be able to return from the lie-flat or bed position to the upright or raised position, which may cause issues. For example, a passenger using the aircraft seat may not be able to extract themselves from the aircraft seat when the aircraft seat is stuck in the lie-flat position. By way of another example, in the case of an emergency flight scenario (e.g., including, but not limited to, excessive acceleration, difficult or bumpy landings, rapid stops, crashes, or the like), aviation guidelines and/or standards may require the aircraft seat to be in the upright or raised position for purposes of safety for both the occupying passenger and surrounding passengers.

Known responses to the shortcomings of the single actuator motor include upgrading to a higher torque motor and adding a single motor. While this may assist in counteracting an excessive load to some degree, the actuator motor(s) would still be non-functioning in the event of power being cut. In addition, the increased size and/or number of the actuator motors may require valuable living space within a passenger compartment be utilized by the aircraft seat.

As such, it may be desirable to provide an aircraft seat with a spring-assisted actuation to assist the single actuator motor. The assisting spring assembly may offset some of the weight of the passenger and/or the aircraft seat as the aircraft seat actuates between the lie-flat or bed position and the upright or raised position. The assisting spring assembly may result in a reduced weight, cost, and/or complexity of the aircraft seat due to fewer actuators being employed in the aircraft seat. The assisting spring assembly may result in a lower bed height, leading to a better utilization of living space (e.g., including a more ergonomic placement of other monuments within a passenger compartment).

FIG. 1 in general illustrates an aircraft seat 100, in accordance with one or more embodiments of the disclosure.

In general, the aircraft seat 100 may be actuatable between one or more positions. For example, the one or more positions may include, but are not limited to, an upright or raised position, one or more lounge or reclined positions, and/or a lie-flat or bed position. For instance, the aircraft seat 100 may be configured to pass through the one or more lounge or reclined positions when actuating between the upright or raised position and the lie-flat or bed position. It is noted herein, however, that the one or more lounge or reclined positions of the aircraft seat 100 may be separate from the one or more upright or raised positions and/or the one or more lie-flat or bed positions. Therefore, the above description should not be interpreted as a limitation on the present disclosure but merely an illustration.

In general, the aircraft seat 100 may be translatable (e.g., trackable or slidable). The aircraft seat 100 may be rotatable about an axis cross-wise through the aircraft seat 100 into a position including, but not limited to, the upright or raised position, the one or more lounge or reclined positions, and/or the lie-flat or bed position. The aircraft seat 100 may be rotatable about an axis (e.g., swivelable). The aircraft seat 100 may be fully positionable between the outer limits of motion as defined by the moveable components of the aircraft seat 100, adjacent aircraft seats 100, monuments within an aircraft cabin, and/or monuments of a passenger compartment. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 100 may be actuatable (e.g., translatable and/or rotatable) from the TTOL position to a non-TTOL position, or vice versa. Further, it is noted herein the aircraft seat 100 may be capable of a fully upright or raised position, and that the TTOL position may have a more reclined seat back cushion 102 and a more angled upward seat pan cushion 104 as compared to the fully upright or raised position. Therefore, the above description should not be interpreted as a limitation on the present disclosure but merely an illustration.

The aircraft seat 100 may include a seat back cushion 102. The seat back cushion 102 may include a head rest. For example, the head rest may be integrated within the seat back cushion 102. By way of another example, the head rest may a separate component coupled to (or inserted into) the seat back cushion 102. For instance, the head rest may be movable relative to the seat back frame of the aircraft seat 100 (e.g., adjustable, removable, or the like).

The aircraft seat 100 may include a seat pan cushion 104. The seat pan cushion 104 may include one or more sections. For example, the seat pan cushion 104 may include a single seat section. By way of another example, the seat pan cushion may include multiple sections, where a first section is a seat section and at least a second section is deployed for use when the aircraft seat 100 is in a lie-flat or bed position.

The seat pan cushion 104 may be coupled to the seat back cushion 102, such that actuation of one may cause a corresponding actuation of the other. For example, the seat pan cushion 104 may be coupled to the seat back cushion 102 via one or more pivot joints. For instance, the seat back cushion 102 may be configured to rotate about an axis through a pivot joint coupling the seat back cushion 102 and the seat pan cushion 104 during actuation between the upright position and the bed position.

The aircraft seat 100 may include a seat pan frame 106. In one non-limiting example, the seat pan frame 106 may be coupled to the seat back cushion 102, such that actuation of one may result in a corresponding actuation of the other. The seat pan cushion 104 may be fixed to the seat pan frame 106. It is noted herein, however, that the seat pan cushion 104 may be actuatable relative to the seat pan frame 106 of the aircraft seat 100 (e.g., adjustable, removable, or the like). Therefore, the above description should not be interpreted as a limitation on the present disclosure but merely an illustration.

The aircraft seat 100 may include a foundation 108. The foundation 108 may be configured to couple to a floor of an aircraft cabin (e.g., either directly or indirectly via an intermediate frame foot). In this regard, the foundation 108 may be considered static, or a static foundation 108 of the aircraft seat 100, for purposes of the disclosure.

The seat pan frame 106 may be configured to actuate relative to the foundation 108. In this regard, the seat pan frame 106 may be considered a sliding upper assembly 106 of the aircraft seat 100, for purposes of the disclosure.

For example, the seat pan frame 106 and the foundation 108 may be coupled via a frame actuation assembly 110, where the frame actuation assembly 110 includes at least a first component 112 coupled to the foundation 108, at least a second component 114 coupled to the seat pan frame 106, and an actuator motor 116 configured to drive the at least a first component 112. For instance, the frame actuation assembly 110 may include a rack-and-pinion assembly, where the at least a first component 112 may include a spur gear and the at least a second component 114 may include a gear rack coupled to a surface of the seat pan frame 106 (or fabricated within the surface of the seat pan frame 106), where the spur gear and the gear rack are configured to engage. Where there are multiple rack-and-pinion assemblies, power may be transferred (e.g., from the actuator motor 116) via one or more rods or linkages 118. It is noted herein the actuator motor 116 may or may not be considered a component of the frame actuation assembly 110, dependent on the method of constructing the frame actuation assembly 110.

In general, the frame actuation assembly 110 may be any actuation assembly configured to couple the seat pan frame 106 and the foundation 108 while allowing for the seat pan frame 106 to move relative to the foundation 108. The frame actuation assembly 110 may include one or more mechanical assemblies. For example, the one or more mechanical assemblies may include, but are not limited to, a combination of toggles (e.g., buttons, switches, levers, or the like), linkages, cam followers, cables, gears, springs, dampeners, interlocking assemblies, or the like). The frame actuation assembly 110 may include one or more electrical assemblies. For example, the one or more electrical assemblies may include, but are not limited to, one or more actuators (e.g., motors, or the like). The frame actuation assembly 110 may include a combination of one or more mechanical assemblies and one or more electrical assemblies (e.g., one or more motors coupled to one or more spring assembly components, or the like). It is noted herein, however, the seat pan frame 106 may be fixed to the foundation 108 (e.g., in an instance when the seat pan cushion 104 is actuatable relative to the seat pan frame 106). Therefore, the above description should not be interpreted as a limitation on the present disclosure but merely an illustration.

The aircraft seat 100 may include one or more actuation linkages 120. The one or more actuation linkages 120 may be configured to support the seat back cushion 102 as the seat back cushion 102 actuates between the upright or raised position and the lie-flat or bed position.

For example, the one or more actuation linkages 120 may be coupled to the seat back cushion 102 via one or more pivot joints 122. For instance, the seat back cushion 102 may be configured to rotate about an axis through a pivot joint 122 coupling the seat back cushion 102 and an actuation linkage 120 during actuation between the upright or raised position and the lie-flat or bed position.

By way of another example, the actuation linkage 120 may be coupled to the foundation 108 via one or more pivot joints 124. For instance, an actuation linkage 120 may be configured to rotate about an axis through a pivot joint 124 coupling the actuation linkage 120 and the foundation 108 during actuation between the upright or raised position and the lie-flat or bed position.

Figure 2A:
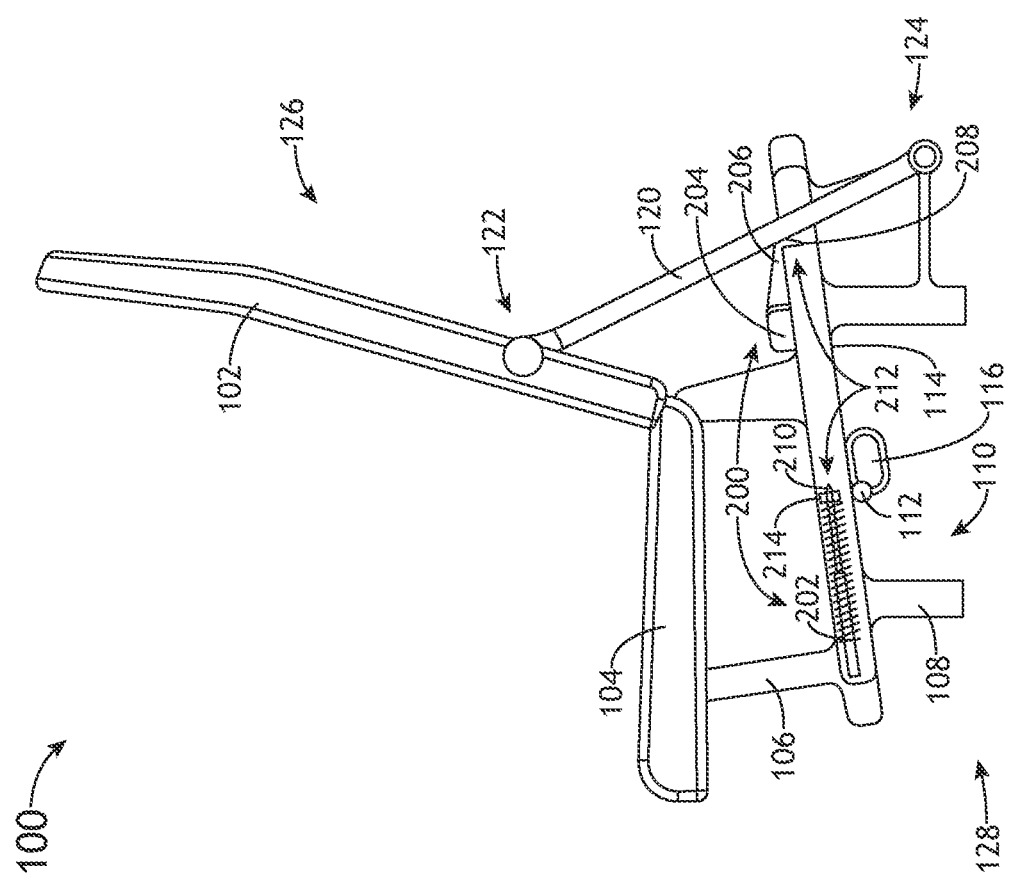
FIG. 2A illustrates an elevation view of an aircraft seat with spring-assisted actuation, in accordance with one or more embodiments of the disclosure.
Figure 2B:
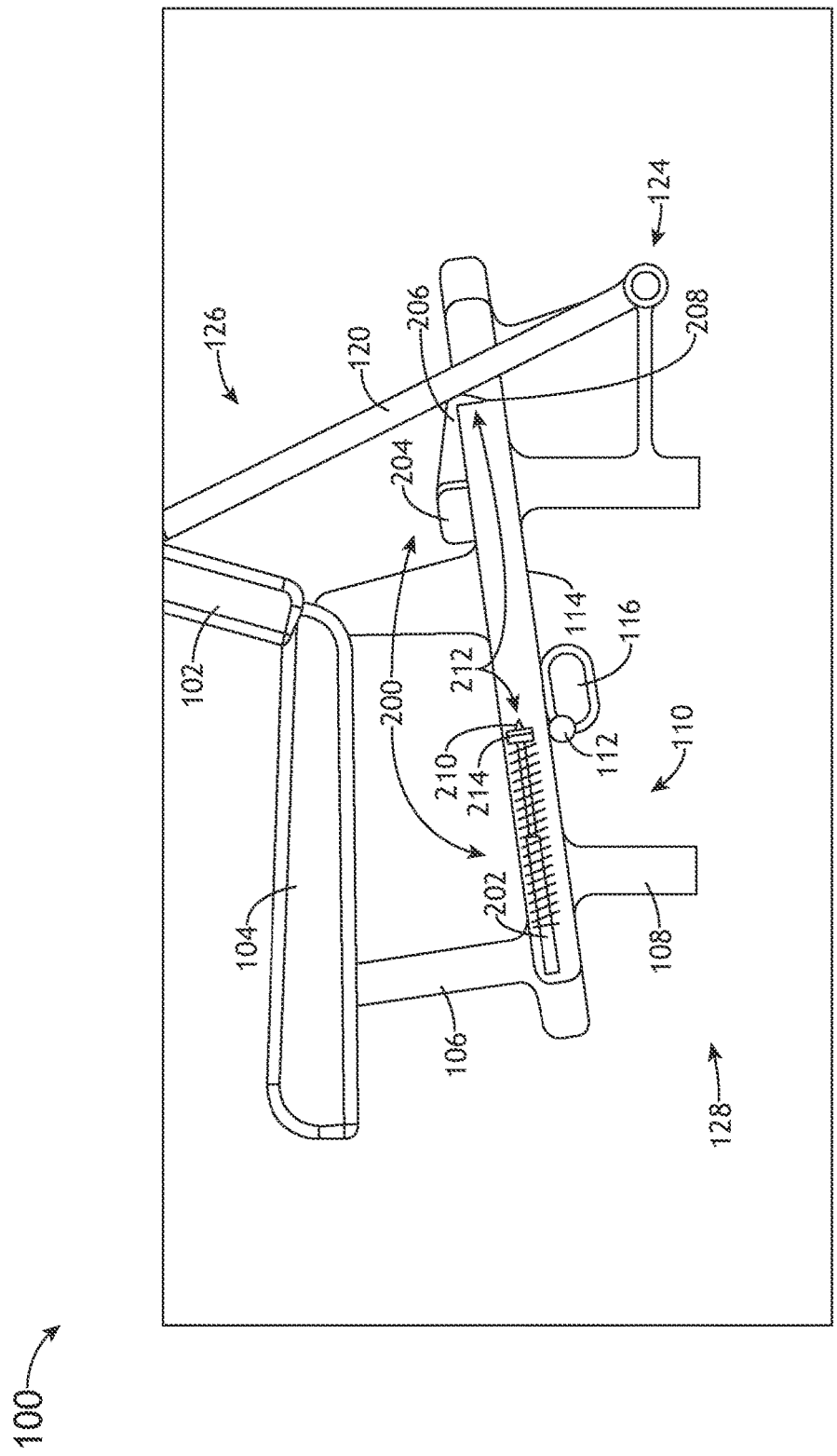
FIG. 2B illustrates a partial elevation view of an aircraft seat with spring-assisted actuation, in accordance with one or more embodiments of the disclosure.
Figure 3A:
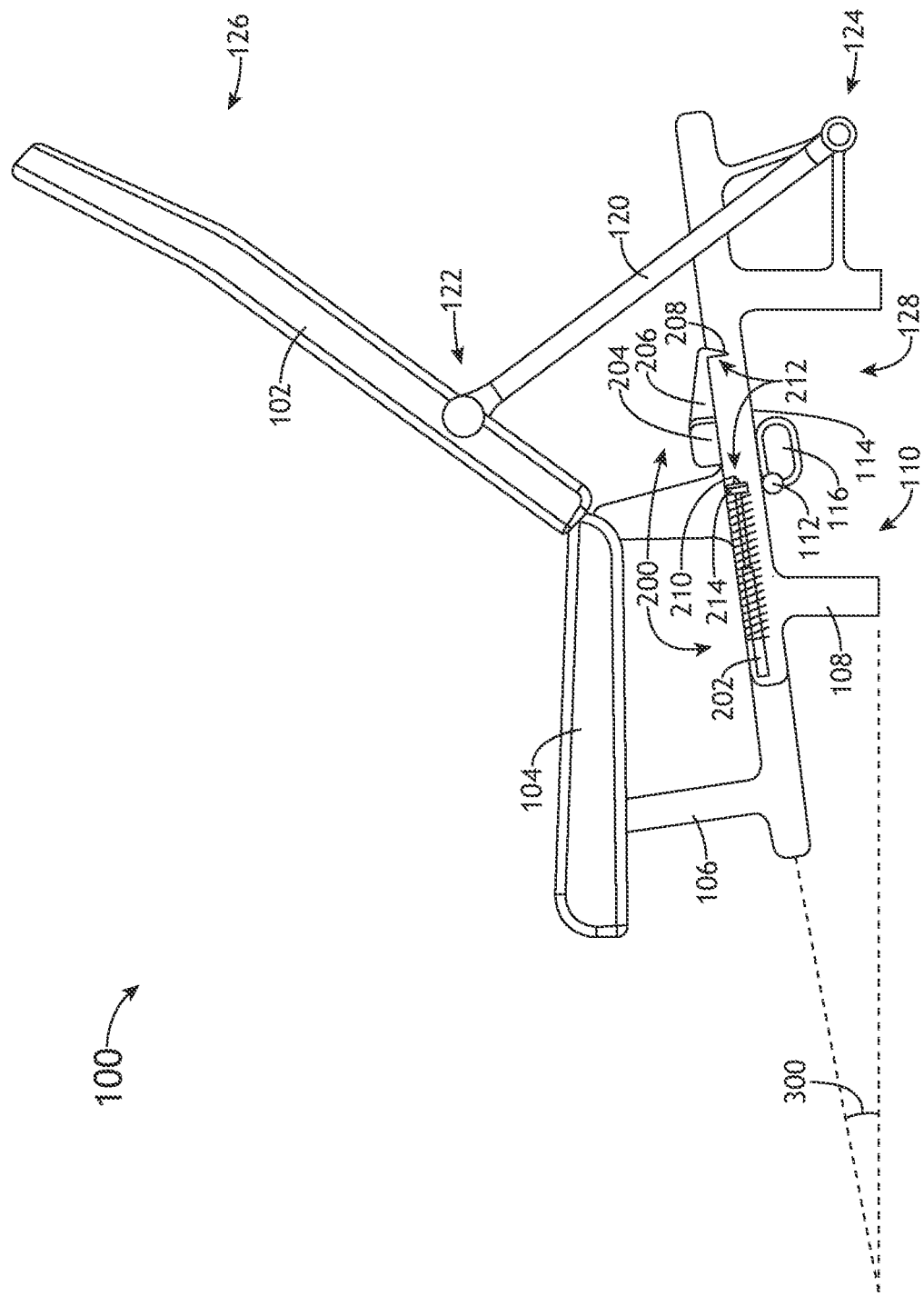
FIG. 3A illustrates an elevation view of an aircraft seat with spring-assisted actuation, in accordance with one or more embodiments of the disclosure.
Figure 3B:
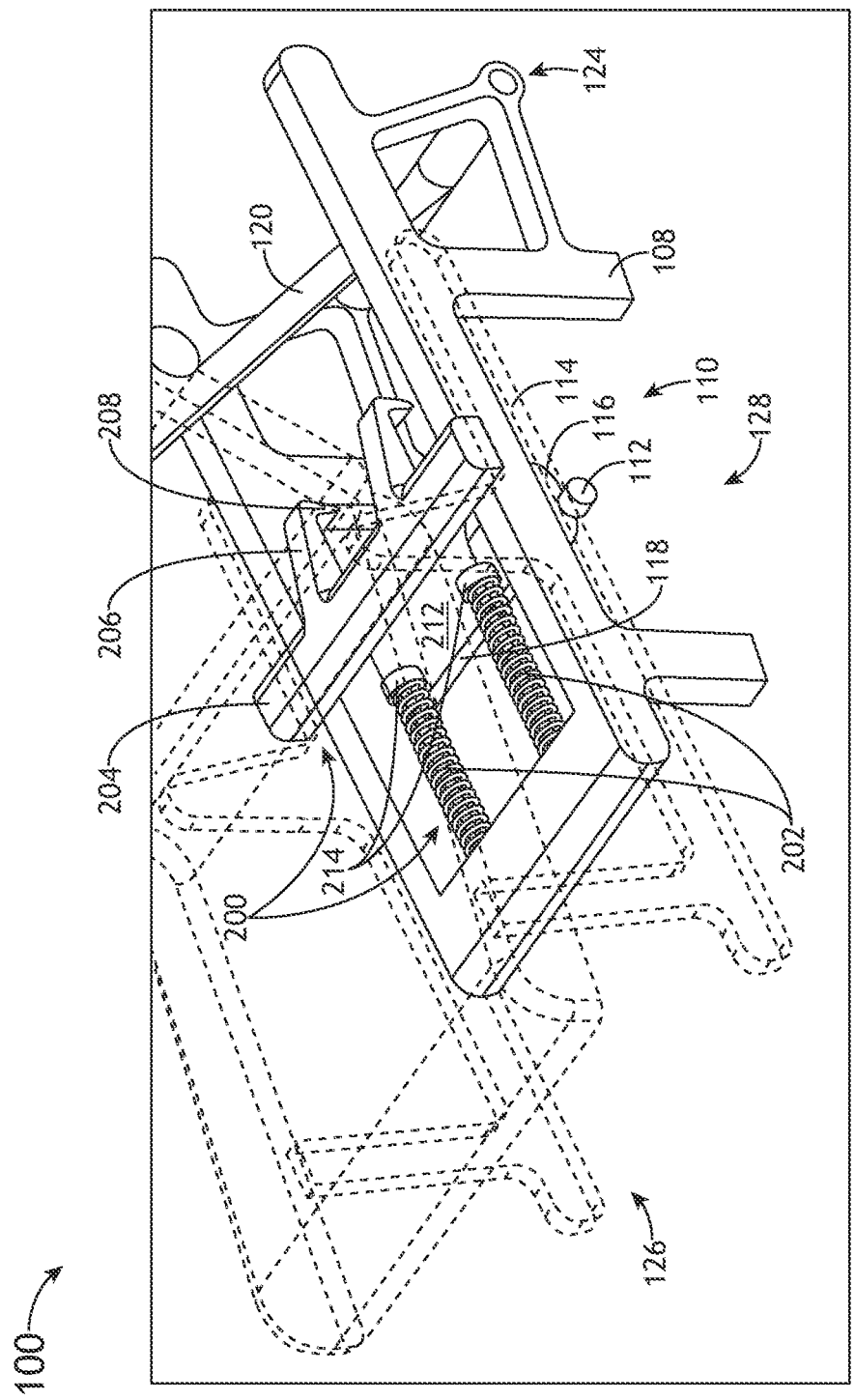
FIG. 3B illustrates a partial perspective view of an aircraft seat with spring-assisted actuation, in accordance with one or more embodiments of the disclosure.
Figure 4A:
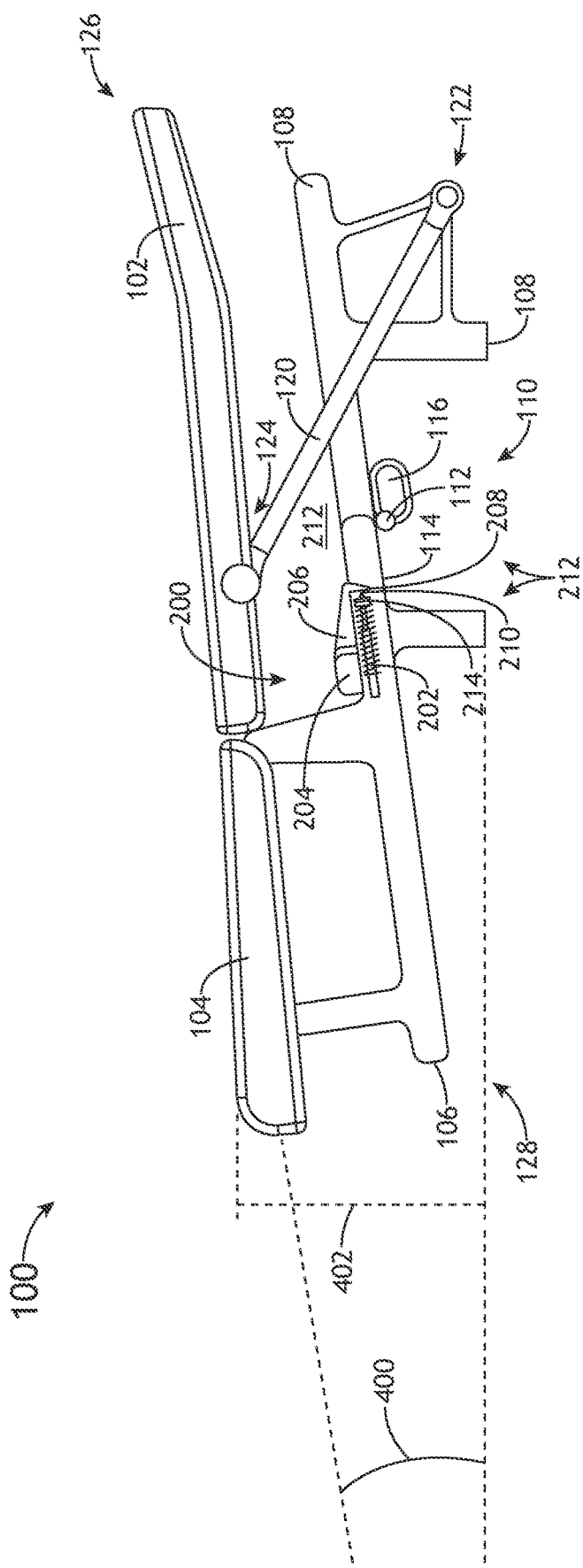
FIG. 4A illustrates an elevation view of an aircraft seat with spring-assisted actuation, in accordance with one or more embodiments of the disclosure.
Figure 4B:
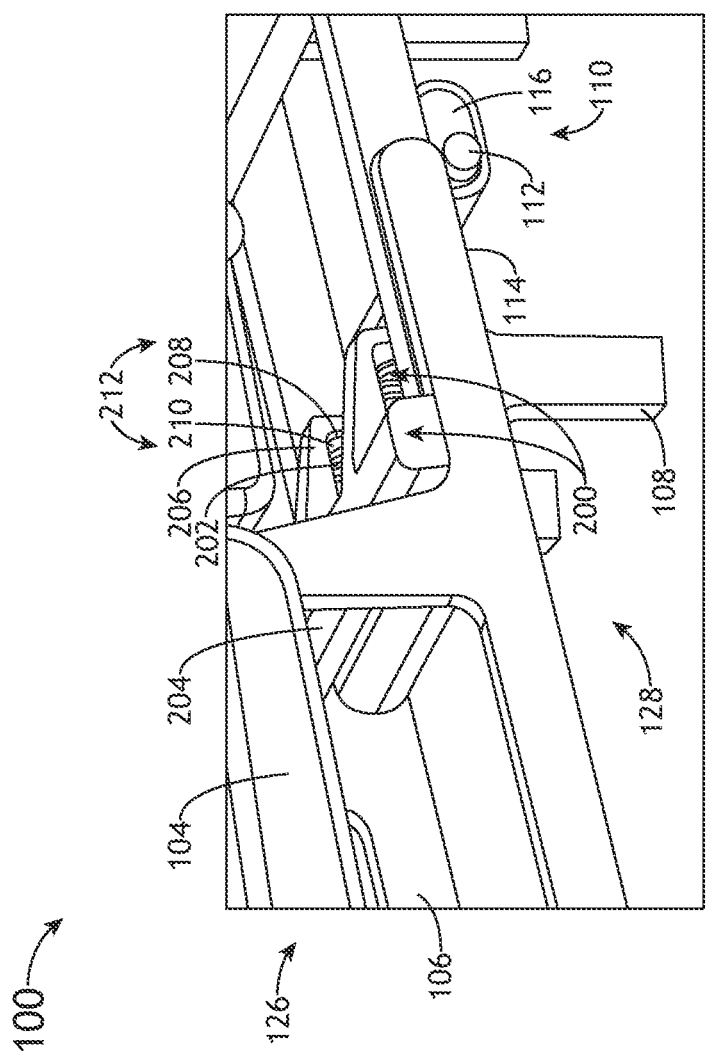
FIG. 4B illustrates a partial perspective view of an aircraft seat with spring-assisted actuation, in accordance with one or more embodiments of the disclosure.
Figure 4C:
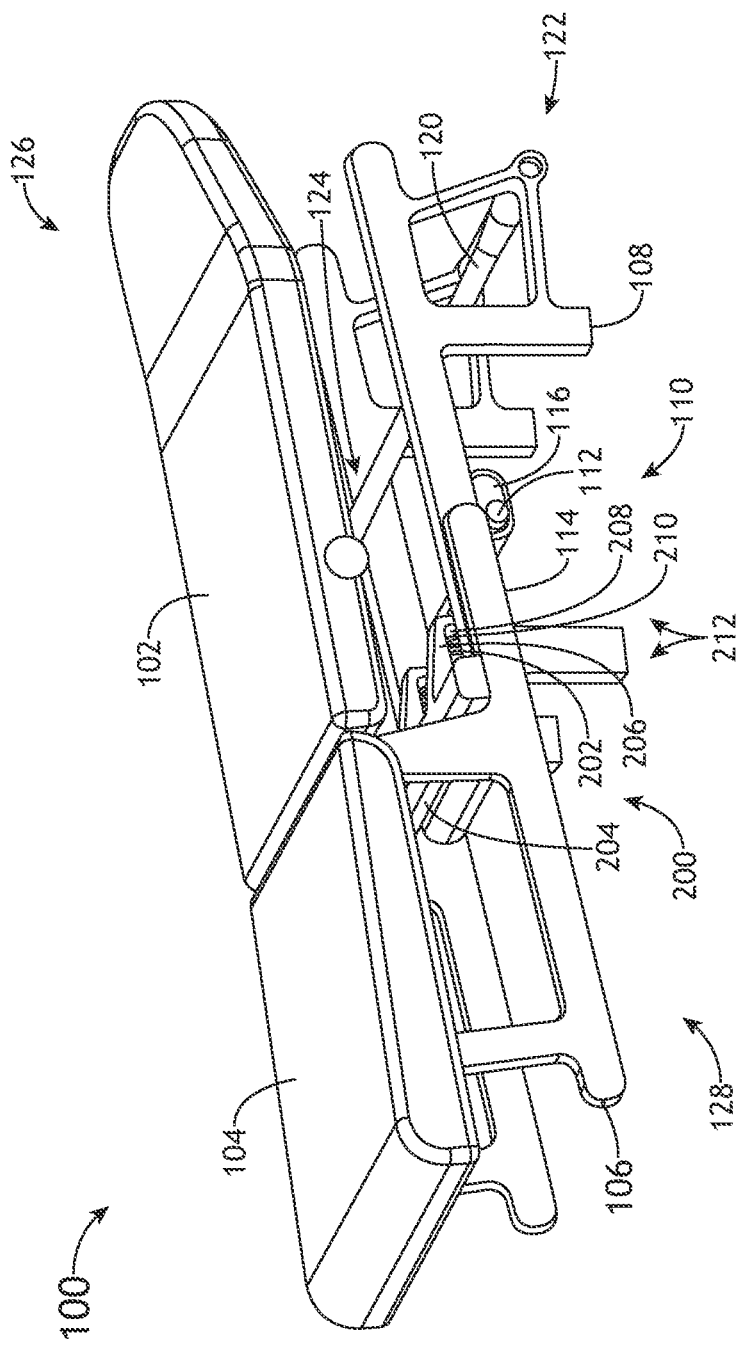
FIG. 4C illustrates a perspective view of an aircraft seat with spring-assisted actuation, in accordance with one or more embodiments of the disclosure.

FIGS. 2A and 2B in general illustrate the aircraft seat 100, in accordance with one or more embodiments of the disclosure.

The aircraft seat 100 may include a mechanical assist assembly or spring assist assembly 200. The spring assist assembly 200 may be configured to assist the actuator motor 116 to actuate the aircraft seat 100 between the lie-flat or bed position and the upright or raised position. For example, the assistance may include providing a force that offsets at least some amount of force required to be applied by the actuator motor 116 to actuate the aircraft seat 100 between the lie-flat or bed position and the upright or raised position.

The spring assist assembly 200 may include one or more springs 202. For example, the one or more springs 202 may include one or more coil springs (or coil-wound springs). For instance, the one or more springs 202 may include one or more compression springs. By way of another example, the one or more springs 202 may include one or more gas springs (or gas-cylinder springs). In one non-limiting example, the one or more springs 202 may include, but are not limited to, two compression springs 202.

The spring assist assembly 200 may include a spring hook cross-member or spring hook bracket 204. The spring hook bracket 204 may include one or more spring hooks 206. The one or more spring hooks 206 may be configured to engage (e.g., mate with) the one or more springs 202. For example, a spring hook 206 may include a recess or surface 208 configured to engage (e.g., mate with) a corresponding protrusion or surface 210 of a corresponding spring 202. For instance, the recess or surface 208 may be configured to align the spring hook 206 with the spring 202 including the corresponding protrusion or surface 210. It is noted herein the recess or surface 208 of the spring hook 206 and the corresponding protrusion or surface 210 of the corresponding spring 202 may be considered components of an interlocking assembly 212.

Where there are multiple spring hooks 206 and corresponding springs 202, the multiple spring hooks 206 may be components of a single spring hook bracket 204 to maintain a continuity of motion of the various spring hooks 206 and corresponding springs 202. It is noted herein, however, that at least some of the multiple spring hooks 206 may be separate. The separate spring hooks 206 may rely on alternative setups (e.g., linkages, connecting rods, or the like) to maintain a continuity of motion of the various spring hooks 206 and corresponding springs 202.

In one non-limiting example, the one or more springs 202 may be coupled to the foundation 108, while the spring hook bracket 204 with a corresponding number of spring hooks 206 may be coupled to the seat pan frame 106. The one or more springs 202 may be fixed in place within the foundation 108, while the spring hook bracket 204 may be movable with the seat pan frame 106. It is noted herein, however, that the one or more springs 202 and the spring hook bracket 204 may be coupled to different components of the aircraft seat 100 without departing from the spirit of the disclosure. Therefore, the above description should not be interpreted as a limitation on the present disclosure but merely an illustration.

The one or more springs 202 may include one or more dampeners 214 (or dampers 214). The one or more dampeners 214 may be configured to prevent the one or more springs 202 from releasing too quickly (e.g., control the release) in the event of a manual unlocking of the actuator motor 116 and the one or more spring hooks 206 interacting with the one or more springs 202. For example, the one or more dampeners 214 may be activated when the aircraft seat 100 is in the lie-flat or bed position, is in a lounge or reclined position where the one or more spring hooks 206 are interacting with the one or more springs 202, and/or is actuating between the lie-flat or bed position and the upright or raised position.

Although embodiments of the disclosure illustrate the one or more dampeners 214 being separate components from the one or more springs 202, it is noted herein the one or more dampeners 214 may be integrated in the one or more springs 202. For example, the one or more springs 202 being gas springs would allow for the springs and dampeners to be integrated into a single component. In addition, it is noted herein the one or more springs 202 and the one or more dampeners 214 may be integrated into the actuator motor 116. For example, a spring and rotary dampener may be integrated into a shaft of the actuator motor 116. Further, it is noted herein the aircraft seat 100 may not include any dampeners 214. Therefore, the above description should not be interpreted as a limitation on the present disclosure but merely an illustration.

In general, the spring assist assembly 200 may be any actuation assembly configured to assist the seat pan frame 106 (and the seat pan cushion 104) to move relative to the foundation 108. The spring assist assembly 200 may include one or more mechanical assemblies. For example, the one or more mechanical assemblies may include, but are not limited to, a combination of toggles (e.g., buttons, switches, levers, or the like), linkages, cam followers, cables, gears, springs, dampeners, interlocking assemblies, or the like. The spring assist assembly 200 may include one or more electrical assemblies. For example, the one or more electrical assemblies may include, but are not limited to, one or more actuators (e.g., motors, or the like). The spring assist assembly 200 may include a combination of one or more mechanical assemblies and one or more electrical assemblies (e.g., one or more motors coupled to one or more spring assembly components, or the like). It is noted herein, however, the seat pan frame 106 may be fixed to the foundation 108 (e.g., in an instance when the seat pan cushion 104 is actuatable relative to the seat pan frame 106). Therefore, the above description should not be interpreted as a limitation on the present disclosure but merely an illustration.

FIGS. 1-4C in general illustrate an actuation between the upright or raised position and the lie-flat or bed position of the aircraft seat 100.

Referring now to FIGS. 1-2B, the aircraft seat 100 may include the upright or raised position. In the upright or raised position, the one or more spring hooks 206 may be in an extended state (e.g., are not compressed) and may not engage the one or more springs 202. For example, the lack of engaging may be due to dimensions including, but not limited to, length of one or more components of the aircraft seat 100. For instance, the one or more components of the aircraft seat 100 may include, but are not limited to, the one or more springs 202, the seat pan frame 106, and/or the foundation 108.

Referring now to FIGS. 3A-4C, the seat pan frame 106 (and the seat cushion 102) may actuate along the foundation 108 during the actuation from the upright or raised position to the lie-flat or bed position. For example, the frame actuation assembly 110 and the actuator motor 116 may actuate the seat pan frame 106 during the actuation from the upright or raised position to the lie-flat or bed position. The one or more spring hooks 206 may actuate toward the one or more springs 202 as the aircraft seat 100 actuates from the upright or raised position to the lie-flat or bed position. The seat back cushion 102 may actuate with the seat pan frame 106 and/or the seat pan cushion 104, and the one or more actuation linkages 120 may pivot about the one or more pivot joints 124 coupled to the foundation 108 and the one or more pivot joints 122 coupled to the seat back cushion 102.

As the seat pan frame 106 (and the seat cushion 102) actuates along the foundation 108 during the actuation from the upright or raised position to the lie-flat or bed position, the one or more spring hooks 206 may engage the one or more springs 202 and begin to compress the one or more springs 202. For example, components of the interlocking assembly 212 (e.g., the recess or surface 208 of the spring hook 206 and the corresponding protrusion or surface 210 of the corresponding spring 202) may engage during the actuation from the upright or raised position to the lie-flat or bed position.

The compression of the one or more springs 202 by the one or more spring hooks 206 may generate a return force within the one or more springs 202. The compression of the one or more springs 202 may assist in counterbalancing a load during the actuation from the upright or raised position to the lie-flat or bed position. For example, the springs may contribute to generating a controlled (e.g., steady, smooth, or the like) actuation or transition while the one or more springs 202 are being compressed during the actuation from the upright or raised position to the lie-flat or bed position.

The surface of the foundation 108 along which the seat pan frame 106 actuates may be sloped, having a frame actuation angle 300 relative to a floor of an aircraft cabin including the aircraft seat 100. For example, the seat pan frame 106 may translate along the surface of the foundation 108. The frame actuation angle 300 may allow for a lower or decreased bed height than conventional convertible aircraft seats, reducing an amount of required living space within a passenger compartment to be utilized by the aircraft seat 100. It is noted herein, however, that the slope may result in needing a greater force to return the aircraft seat 100 from the lie-flat or bed position to the upright or raised position. In addition, it is noted herein the direction of actuation of the seat pan frame 106 along the foundation 108 may be parallel or substantially parallel to the floor of the aircraft cabin, with the actuation surface of the foundation 108 being parallel or substantially parallel. Therefore, the above description should not be interpreted as a limitation on the present disclosure but merely an illustration.

The lie-flat or bed position may be set at a compensation angle 402 relative to the floor of the aircraft cabin including the aircraft seat 100. It is noted herein the compensation angle 402 may be at or approximate to an angle selected to offset a nose angle of the aircraft seat 100 (e.g., during a cruising stage of a flight). In one non-limiting example, the compensation angle 402 may be a three-degree angle to offset a three-degree nose angle of the aircraft seat 100. It is noted herein the frame actuation angle 300 and the compensation angle 400 may be different or may be the same.

The one or more springs 202 may be fully compressed by the one or more spring hooks 206 when the aircraft seat 100 is in the lie-flat or bed position. The lie-flat or bed position may have a bed height 402. For example, the bed height 402 may be measured or defined relative to a floor of an aircraft cabin. It is noted herein that a force needed to actuate the seat may be greatest at or approximate to the lie-flat or bed position.

The aircraft seat 100 may be locked in the lie-flat or bed position, and the one or more springs 202 may store and retain the return force until the aircraft seat 100 is unlocked. It is noted herein the aircraft seat 100 may include one or more mechanical assemblies and/or one or more electrical assemblies (e.g., as described throughout the disclosure) configured to prevent the aircraft seat 100 from actuating when the aircraft seat 100 is in the lie-flat or bed position. In addition, it is noted herein the aircraft seat 100 may include one or more mechanical assemblies and/or one or more electrical assemblies (e.g., as described throughout the disclosure) configured to prevent the aircraft seat 100 from actuating when the aircraft seat 100 is in the upright or raised position. Therefore, the above description should not be interpreted as a limitation on the present disclosure but merely an illustration.

When the aircraft seat 100 is unlocked, the frame actuation assembly 110 and the actuator motor 116 may actuate the aircraft seat 100 from the lie-flat or bed position to the upright or raised position. The return force stored in the one or more springs 202 may be released to assist the frame actuation assembly 110 and the actuator motor 116 during actuation of the aircraft seat 100 from the lie-flat or bed position to the upright or raised position. It is noted herein that the one or more dampeners 214 may cause the return force stored in the one or more springs 202 to be released in a dampened capacity.

It is noted herein the aircraft seat 100 may include a mechanical override assembly to actuate the aircraft seat 100 from the lie-flat or bed position to the upright or raised position in case of power being cut to the actuator motor 116 and/or in case of an emergency aircraft scenario. For example, the mechanical override assembly may include, but is not limited to, a combination of toggles (e.g., buttons, switches, levers, or the like), linkages, cam followers, cables, gears, springs, dampeners, interlocking assemblies, or the like.

The assistance provided by the return force stored in the one or more springs 202 when released during the actuation from the lie-flat or bed position to the upright or raised position may allow for a single individual (e.g., a flight attendant, a passenger, or the like) to actuate the aircraft seat 100 from the lie-flat or bed position to the upright or raised position in case of power being cut to the actuator motor 116 and/or in case of an emergency aircraft scenario when the mechanical override assembly is triggered.

Although embodiments of the disclosure illustrate the one or more spring hooks 206 not engaging the one or more springs 202 full-time it is noted herein that the dimensions of the one or more components of the aircraft seat 100 may be such that the one or more spring hooks 206 may engage the one or more springs 202, but not provide a return force (or provide only a negligible return force). Therefore, the above description should not be interpreted as a limitation on the present disclosure but merely an illustration.

It is noted herein that components of the aircraft seat 100 including, but not limited to, the seat back cushion 102, the seat pan cushion 104, the seat pan frame 106, and/or components of the aircraft seat 100 coupled to the seat pan frame 106 (e.g., components of the frame actuation assembly 110, components of the spring assist assembly 200, or the like) may be considered an upper aircraft seat assembly 126, for purposes of the disclosure. In addition, it is noted herein that components of the aircraft seat 100 including, but not limited to, the foundation 108 and/or components of the aircraft seat 100 coupled to the foundation 108 (e.g., components of the frame actuation assembly 110, components of the spring assist assembly 200, or the like) may be considered a lower aircraft seat assembly 128, for purposes of the disclosure.

The upper aircraft seat assembly 126 may be configured to be in the upright or raised position, the lounge or reclined position, and/or the lie-flat or bed position relative to the lower aircraft seat assembly 128. For example, the upper aircraft seat assembly 126 may be configured to actuate between the upright or raised position, the lounge or reclined position, and/or the lie-flat or bed position relative to the lower aircraft seat assembly 128.

Where the upper aircraft seat assembly 126 includes the seat pan cushion 104 and the seat back cushion 102, the seat pan cushion 104 and the seat back cushion 102 may form a set of upright or raised surfaces when the upper aircraft seat assembly 126 is in the upright or raised position. Where the upper aircraft seat assembly 126 includes the seat pan cushion 104 and the seat back cushion 102, the seat pan cushion 104 and the seat back cushion 102 may form a set of lounge or reclined surfaces when the upper aircraft seat assembly 126 is in the lounge or reclined position. Where the upper aircraft seat assembly 126 includes the seat pan cushion 104 and the seat back cushion 102, the seat pan cushion 104 and the seat back cushion 102 may form a lie-flat or bed surface when the upper aircraft seat assembly 126 is in the lie-flat or bed position.

Figure 5A:
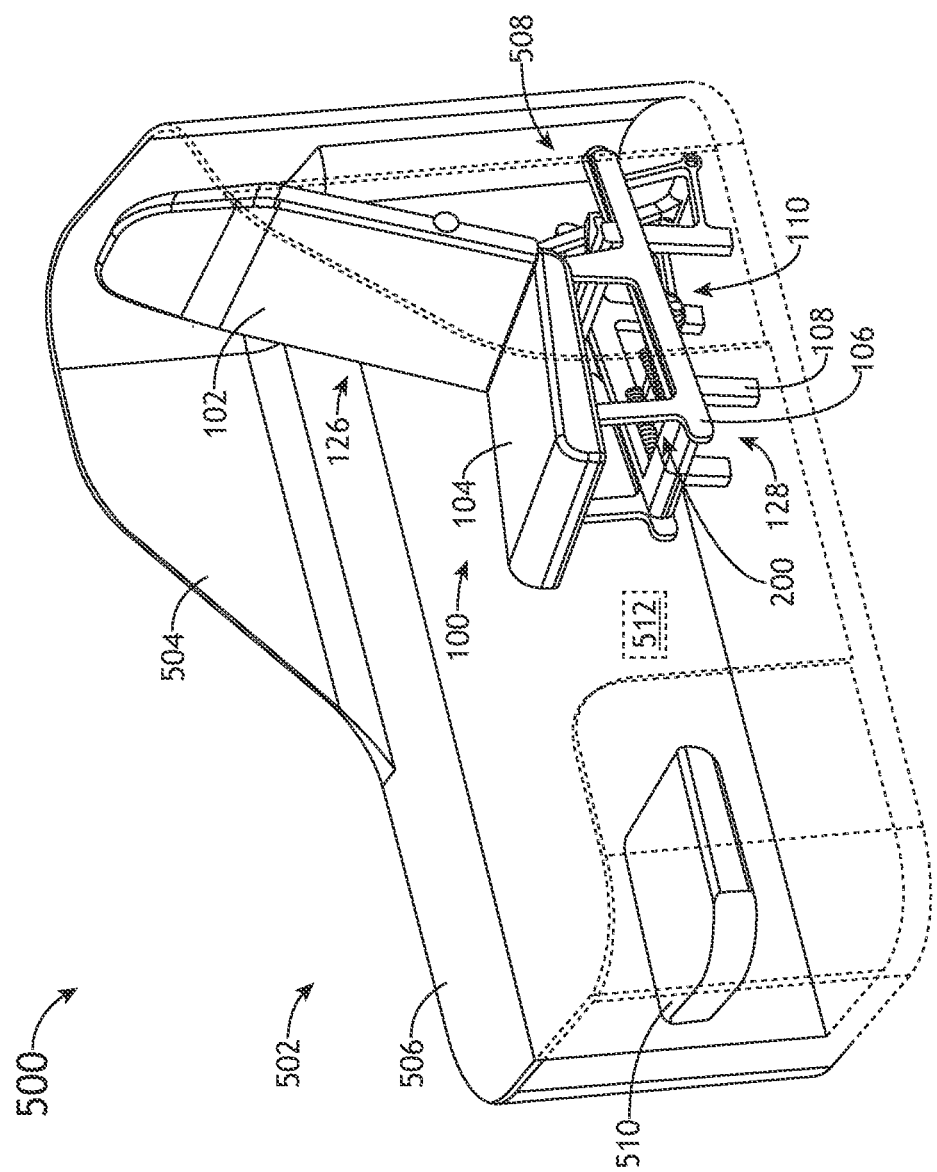
FIG. 5A illustrates a perspective view of a passenger compartment including an aircraft seat with spring-assisted actuation, in accordance with one or more embodiments of the disclosure.
Figure 5B:
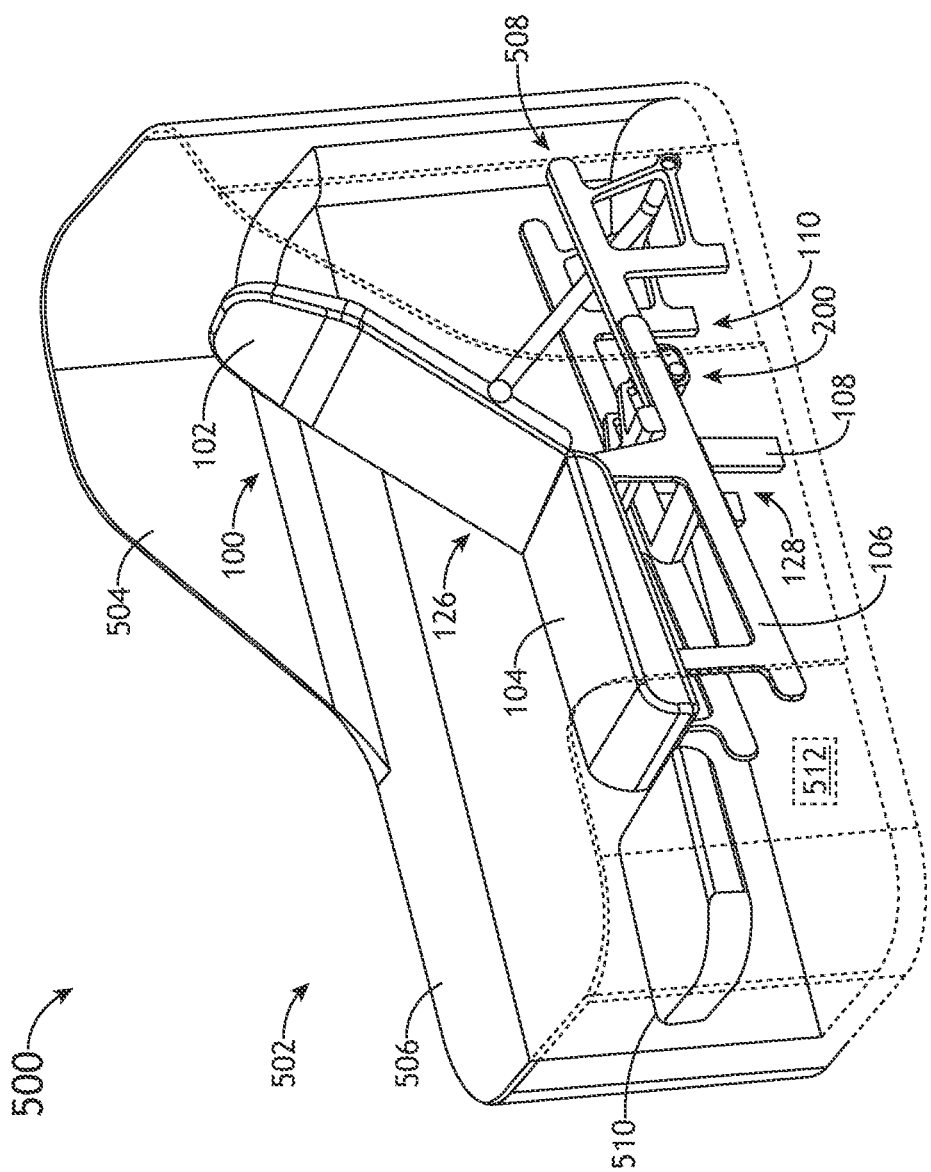
FIG. 5B illustrates a perspective view of a passenger compartment including an aircraft seat with spring-assisted actuation, in accordance with one or more embodiments of the disclosure.
Figure 5C:
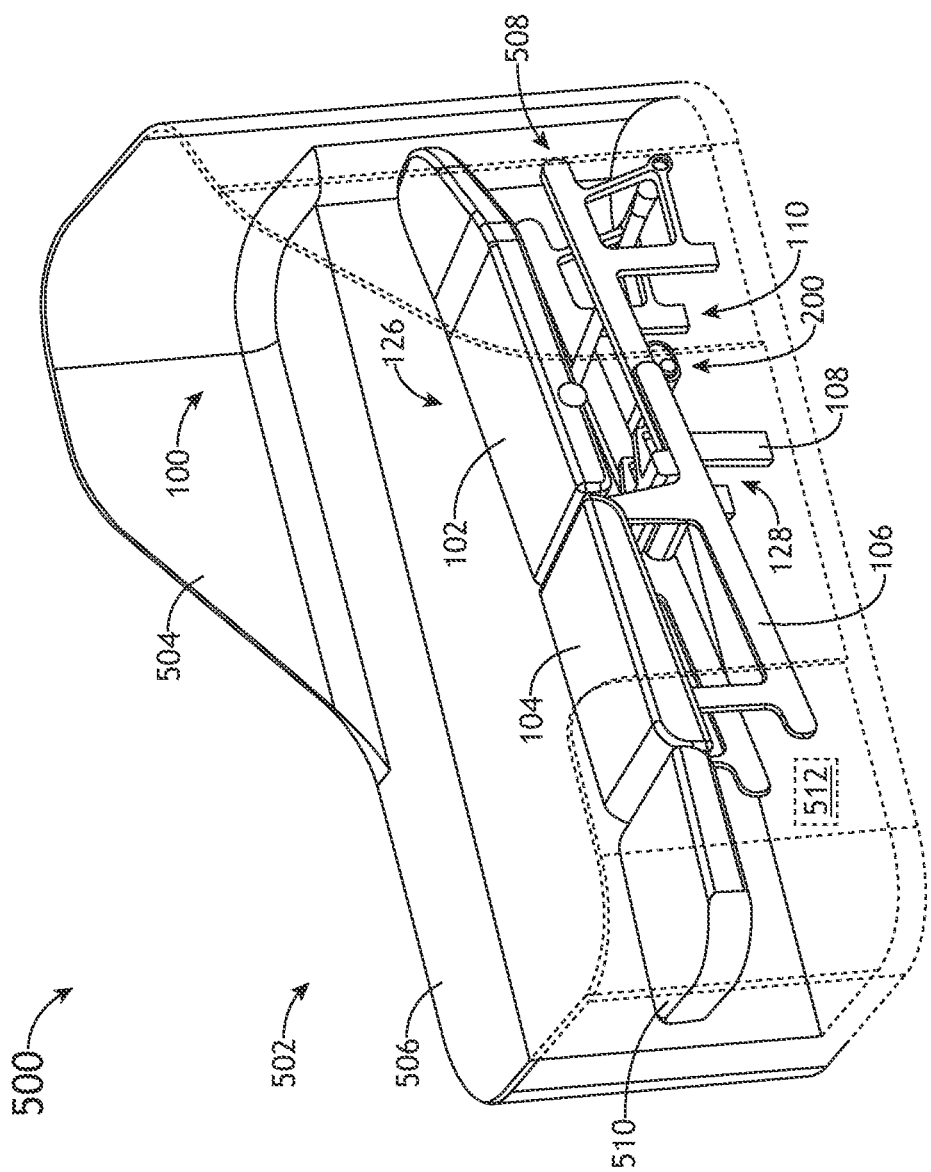
FIG. 5C illustrates a perspective view of a passenger compartment including an aircraft seat with spring-assisted actuation, in accordance with one or more embodiments of the disclosure.

FIGS. 5A-5C in general illustrate the aircraft seat 100, in accordance with one or more embodiments of the disclosure.

The aircraft seat 100 may be positioned within an aircraft cabin 500. For example, the aircraft seat 100 may be directly positioned within an aircraft cabin 500. By way of another example, the aircraft seat 100 may be positioned within a passenger compartment 502, where the passenger compartment 502 is positioned within the aircraft cabin 500. Although embodiments of the disclosure illustrate the passenger compartment 502 as including a single aircraft seat 100, it is noted herein the passenger compartment 502 may include multiple aircraft seats 100. Therefore, the above description should not be interpreted as a limitation on the present disclosure but merely an illustration.

The passenger compartment 502 may include a privacy shell 504 with one or more privacy shell elements. The privacy shell 504 may include an opening within the one or more privacy shell elements into the passenger compartment 502. The privacy shell 504 may include a door, a curtain, or other privacy elements for the opening. For example, the door may rotate about an axis and/or translate into an open position against a privacy shell element. By way of another example, a privacy shell element may be at least partially hollow, and the door may be slid into a cavity defined in the one or more privacy shell elements.

The passenger compartment 502 may include one or more monuments 506. The aircraft seat 100 may be configured to avoid contact with the one or more monuments 506 when actuating between positions (e.g., between the upright or raised position and the lie-flat or bed position).

At least a portion of the passenger compartment 502 (e.g., at least a portion of the privacy shell 504, a monument 506 of the one or more monuments 506, or the like) may conform to a portion of the aircraft seat 100. In this regard, the amount of aircraft cabin floor space necessary for the passenger compartment 502 may be reduced.

The aircraft compartment 502 may include a cavity or space 508. The aircraft seat 100 may be configured to fit within the cavity or space 508 when actuating between positions (e.g., between the upright or raised position and the lie-flat or bed position). The privacy shell 504 (and thus the passenger compartment 502) may not need to be configured to include additional geometrical constraints to accommodate the aircraft seat 100 in the lie-flat or bed position.

The aircraft seat 100 may be proximate to an ottoman 510. For example, the aircraft seat 100 and the ottoman 510 may form the lie-flat surface when the aircraft seat 100 and the ottoman 510 are each in a lie-flat position.

The ottoman 510 may be positioned underneath and/or proximate to at least some of the one or more monuments 506 of the passenger compartment 502. For example, the monument 506 may include, but is not limited to, a side stand, a tray or table, or the like. Where the monument includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be fixed in position. It is noted herein, however, that the tray or table may be actuatable (e.g., may extend a select distance from a stowed position to an extended position proximate to a passenger).

The ottoman 510 may be positioned within a footwell 512 of the passenger compartment 502. For instance, one or more dimensions of the footwell 512 may be changed by actuating the aircraft seat 100 between the upright or raised position, a lounge or reclined position, and/or the lie-flat position. It is noted herein that a portion of the ottoman 510 may be actuatable (e.g., along a set of tracks or linear rails) to a position outside of the footwell 512.

The ottoman 510 may be configured to translate and/or rotate about an axis through a sidewall of the ottoman to point a top surface to a passenger occupying the aircraft seat 100. For example, where the ottoman 510 may be configured to both translate and rotate, the ottoman 510 may be configured to independently translate and/or rotate. By way of another example, where the ottoman 510 may be configured to both translate and rotate, a rotation may prevent further translation until the ottoman 510 is returned to a select position and/or a translation may prevent further rotation until the ottoman 510 is returned to a select position.

Where the upper aircraft seat assembly 126 includes the seat pan cushion 104 and the seat back cushion 102, the seat pan cushion 104, the seat back cushion 102, and the ottoman 510 may form a set of upright or raised surfaces when the upper aircraft seat assembly 126 is in the upright or raised position. Where the upper aircraft seat assembly 126 includes the seat pan cushion 104 and the seat back cushion 102, the seat pan cushion 104, the seat back cushion 102, and the ottoman 510 may form a set of lounge or reclined surfaces when the upper aircraft seat assembly 126 is in the lounge or reclined position. Where the upper aircraft seat assembly 126 includes the seat pan cushion 104 and the seat back cushion 102, the seat pan cushion 104, the seat back cushion 102, and the ottoman 510 may form a lie-flat or bed surface when the upper aircraft seat assembly 126 is in the lie-flat or bed position.

It is noted herein, however, the aircraft seat 100 and/or the ottoman 510 may be limited to an upright or raised position and/or one or more lounge or reclined positions. In addition, it is noted herein the aircraft seat 100 may be the sole component forming a bed when the aircraft seat 100 is in a lie-flat position. Therefore, the above description should not be interpreted as a limitation on the present disclosure but merely an illustration.

In this regard, the spring assist assembly 200 of the aircraft seat 100 may be configured to assist the actuator motor 116. The spring assist assembly 200 (or at least some components of the spring assist assembly 200) in the aircraft seat 100 may offset any additional force required when actuating the upper aircraft seat assembly 126 from a lower or decreased bed height 402 of the lie-flat or bed position (e.g., as measured from the floor of the aircraft cabin), the lower or decreased bed height 402 being caused at least in part by the sloped actuation surface of the foundation 108 having the frame actuation angle 300, as compared to a force required when actuating a conventional aircraft seat from a conventional bed height. The spring assist assembly 200 of the aircraft seat 100 may offset some of the weight of the passenger and/or the aircraft seat 100 as the aircraft seat 100 actuates between the lie-flat or bed position and the upright or raised position. The spring assist assembly 200 of the aircraft seat 100 may result in a reduced weight, cost, and/or complexity of the aircraft seat 100 due to fewer actuators being employed in the aircraft seat 100. For example, the aircraft seat 100 may require a smaller and/or fewer number of actuator motors 116 within the frame actuation assembly 110 with the addition of the spring assist assembly 200. For instance, at least one of a size or a power output of the actuator motor 116 may be selected based on the addition of the spring assist assembly 200, and the size of the actuator motor 116 may be smaller than conventionally used. As such, the use of the spring assist assembly 200 (or at least some components of the spring assist assembly 200) in the aircraft seat 100 may lead to a better utilization of living space (e.g., including a more ergonomic placement of other monuments 506 within the passenger compartment 502).

It is noted herein the aircraft seat 100 and/or the components of the aircraft seat 100 (e.g., the spring assist assembly 200 and other components) may installed within an aviation environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an aviation environment, it is noted herein the spring assist assembly 200 is not limited to the aircraft seat 100 within the aviation environment and/or the aircraft components within the aviation environment. For example, the spring assist assembly 200 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the spring assist assembly 200 may be coupled to and/or configured to operate with apparatuses sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, comprising:
an upper aircraft seat assembly configured to actuate between an upright position and a bed position, the upper aircraft seat assembly comprising:
a seat pan frame; and
at least one spring hook coupled to the seat pan frame;
a lower aircraft seat assembly, comprising:
a foundation coupled to a floor of an aircraft cabin, the foundation including a linear sloped actuation surface configured to cause the upper aircraft seat assembly to be at a decreased height relative to the floor of the aircraft cabin when the upper aircraft seat assembly is in the bed position, the direction of actuation of the seat pan frame along the foundation being substantially parallel to the floor of the aircraft cabin with the linear sloped actuation surface of the foundation being substantially parallel; and
at least one spring coupled to the foundation, the at least one spring being extended when the upper aircraft seat assembly is in the upright position, the at least one spring being compressed by the at least one spring hook when the upper aircraft seat assembly is in the bed position, the compressing of the at least one spring configured to generate a return force within the at least one spring, the compressing of the at least one spring configured to counterbalance a load within the aircraft seat and generate a controlled actuation of the upper aircraft seat assembly from the upright position to the bed position; and
a frame actuation assembly configured to actuate the upper aircraft seat assembly relative to the lower aircraft seat assembly between the upright position and the bed position, the at least one spring configured to provide the return force against the at least one spring hook and assist the frame actuation assembly during actuation of the upper aircraft seat assembly from the decreased height of the bed position to the upright position.

2. The aircraft seat of claim 1, the at least one spring including a protrusion, the at least one spring hook including a recess, the recess of the at least one spring hook configured to mate with the protrusion of the at least one spring when the at least one spring hook compresses the at least one spring.

3. The aircraft seat of claim 1, the at least one spring including a dampener, the dampener configured to control a release of the return force against the at least one spring hook when assisting the frame actuation assembly during the actuation of the upper aircraft seat assembly from the bed position to the upright position.

4. The aircraft seat of claim 1, the at least one spring including two springs, the at least one spring hook including two spring hooks, the two spring hooks being coupled to a spring hook bracket.

5. The aircraft seat of claim 1, the frame actuation assembly comprising:
a first component coupled to the seat pan frame;
an actuator motor configured to drive the first component; and
a second component coupled to the foundation, the second component configured to engage the first component,
the upper aircraft seat assembly being configured to actuate between the upright position and the bed position relative to the lower aircraft seat assembly when the first component is driven by the actuator motor.

6. The aircraft seat of claim 5, the first component including a spur gear, the second component including a gear rack of the seat pan frame.

7. The aircraft seat of claim 5, at least one of a size or a power output of the actuator motor being selected based on the addition of the at least one spring within the aircraft seat.

8. The aircraft seat of claim 1, the upper aircraft seat assembly comprising:
a seat pan cushion coupled to the seat pan frame; and
a seat back cushion coupled to the seat pan cushion,
the seat pan cushion and the seat back cushion configured to form a bed surface when the upper aircraft seat assembly is in the bed position.

9. The aircraft seat of claim 8, the seat back cushion being coupled to the foundation via at least one actuation linkage.

10. The aircraft seat of claim 9, the seat back cushion configured to rotate about an axis through a pivot joint coupling the seat back cushion and the at least one actuation linkage when the upper aircraft seat assembly actuates between the upright position and the bed position.

11. The aircraft seat of claim 9, the seat back cushion configured to rotate about an axis through a pivot joint coupling the foundation and the at least one actuation linkage when the upper aircraft seat assembly actuates between the upright position and the bed position.

12. The aircraft seat of claim 8, the seat back cushion and the seat pan cushion configured to form a bed surface when the upper aircraft seat assembly is in the bed position.

13. A passenger compartment of an aircraft cabin, comprising:
a privacy shell; and
an aircraft seat positioned within the privacy shell, the aircraft seat comprising:
an upper aircraft seat assembly configured to actuate between an upright position and a bed position, the upper aircraft seat assembly comprising:
a seat pan frame; and
at least one spring hook coupled to the seat pan frame;
a lower aircraft seat assembly, comprising:
a foundation coupled to a floor of the aircraft cabin, the foundation including a linear sloped actuation surface configured to cause the upper aircraft seat assembly to be at a decreased height relative to the floor of the aircraft cabin when the upper aircraft seat assembly is in the bed position, the direction of actuation of the seat pan frame along the foundation being substantially parallel to the floor of the aircraft cabin with the linear sloped actuation surface of the foundation being substantially parallel; and
at least one spring coupled to the foundation, the at least one spring being extended when the upper aircraft seat assembly is in the upright position, the at least one spring being compressed by the at least one spring hook when the upper aircraft seat assembly is in the bed position, the compressing of the at least one spring configured to generate a return force within the at least one spring, the compressing of the at least one spring configured to counterbalance a load within the aircraft seat and produce a controlled actuation of the upper aircraft seat assembly from the upright position to the bed position; and a frame actuation assembly configured to actuate the upper aircraft seat assembly relative to the lower aircraft seat assembly between the upright position and the bed position, the at least one spring configured to provide the return force against the at least one spring hook and assist the frame actuation assembly during actuation of the upper aircraft seat assembly from the decreased height of the bed position to the upright position.

14. The passenger compartment of claim 13, comprising an ottoman, the ottoman positioned proximate to the aircraft seat within the privacy shell.

15. The passenger compartment of claim 14, the upper aircraft seat assembly comprising:
a seat pan cushion coupled to the seat pan frame; and
a seat back cushion coupled to the seat pan cushion,
the seat back cushion, the seat pan cushion, and the ottoman configured to form a bed surface when the upper aircraft seat assembly is in the bed position.

* * * * *